United States Patent
Joshi et al.

(10) Patent No.: US 8,916,123 B2
(45) Date of Patent: Dec. 23, 2014

(54) AMMONIA SYNTHESIS USING LITHIUM ION CONDUCTIVE MEMBRANE

(75) Inventors: Ashok V. Joshi, Salt Lake City, UT (US); Sai Bhavaraju, West Jordan, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 355 days.

(21) Appl. No.: 13/428,214

(22) Filed: Mar. 23, 2012

(65) Prior Publication Data

US 2012/0241328 A1   Sep. 27, 2012

Related U.S. Application Data

(60) Provisional application No. 61/466,531, filed on Mar. 23, 2011.

(51) Int. Cl.
*C01C 1/02* (2006.01)
*C25B 1/00* (2006.01)
*C25B 9/08* (2006.01)
*C25B 11/03* (2006.01)
*C25B 13/04* (2006.01)

(52) U.S. Cl.
CPC ... *C25B 1/00* (2013.01); *C25B 9/08* (2013.01); *C25B 11/035* (2013.01); *C25B 13/04* (2013.01)
USPC .......................................... 423/353; 205/491

(58) Field of Classification Search
USPC .......................................... 423/353; 205/491
See application file for complete search history.

(56) References Cited

U.S. PATENT DOCUMENTS

| | | | |
|---|---|---|---|
| 2,660,514 A * | 11/1953 | Rohrman | 423/210.5 |
| 5,290,405 A | 3/1994 | Joshi et al. | |
| 5,580,430 A | 12/1996 | Balagopal et al. | |
| 6,221,225 B1 | 4/2001 | Mani | |
| 6,712,950 B2 | 3/2004 | Denvir et al. | |
| 7,708,966 B2 | 5/2010 | Joshi | |
| 2008/0245671 A1 | 10/2008 | Balagopal et al. | |

FOREIGN PATENT DOCUMENTS

JP    2001-324490    11/2001

OTHER PUBLICATIONS

Marnellos et al., "Synthesis of Ammonia at Atmospheric Pressure with the Use of Solid State Proton Conductors", Journal of Catalysis (no month, 2000), vol. 193, pp. 80-87.*

Lee, Jin H., "International Search Report", PCT application No. PCT/US2012/030264 (corresponding to U.S. Appl. No. 13/428,214), (Oct. 24, 2012)), 1-3.

(Continued)

Primary Examiner — Edna Wong
(74) Attorney, Agent, or Firm — David Fonda

(57) ABSTRACT

Ammonia is synthesized using electrochemical and non-electrochemical reactions. The electrochemical reactions occur in an electrolytic cell having a lithium ion conductive membrane that divides the electrochemical cell into an anolyte compartment and a catholyte compartment. The catholyte compartment includes a porous cathode closely associated with the lithium ion conductive membrane. The overall electrochemical reaction is: $6LiOH + N_2 \rightarrow Li_3N$ (s) $+ 3H_2O + 3/2O_2$. The nitrogen may be produced by a nitrogen generator. The non-electrochemical reaction involves reacting lithium nitride with water and/or steam as follows: $Li_3N$ (s) $+ 3H_2O \rightarrow 3LiOH + NH_3$ (g). The ammonia is vented and collected. The lithium hydroxide is preferably recycled and introduced into the anolyte compartment. The electrolytic cell is shut down prior to reacting the lithium nitride with water. The cathode is preferably dried prior to start up of the electrolytic cell and electrolyzing $Li^+$ and $N_2$ at the cathode.

22 Claims, 2 Drawing Sheets

(56) References Cited

OTHER PUBLICATIONS

Figure 1:
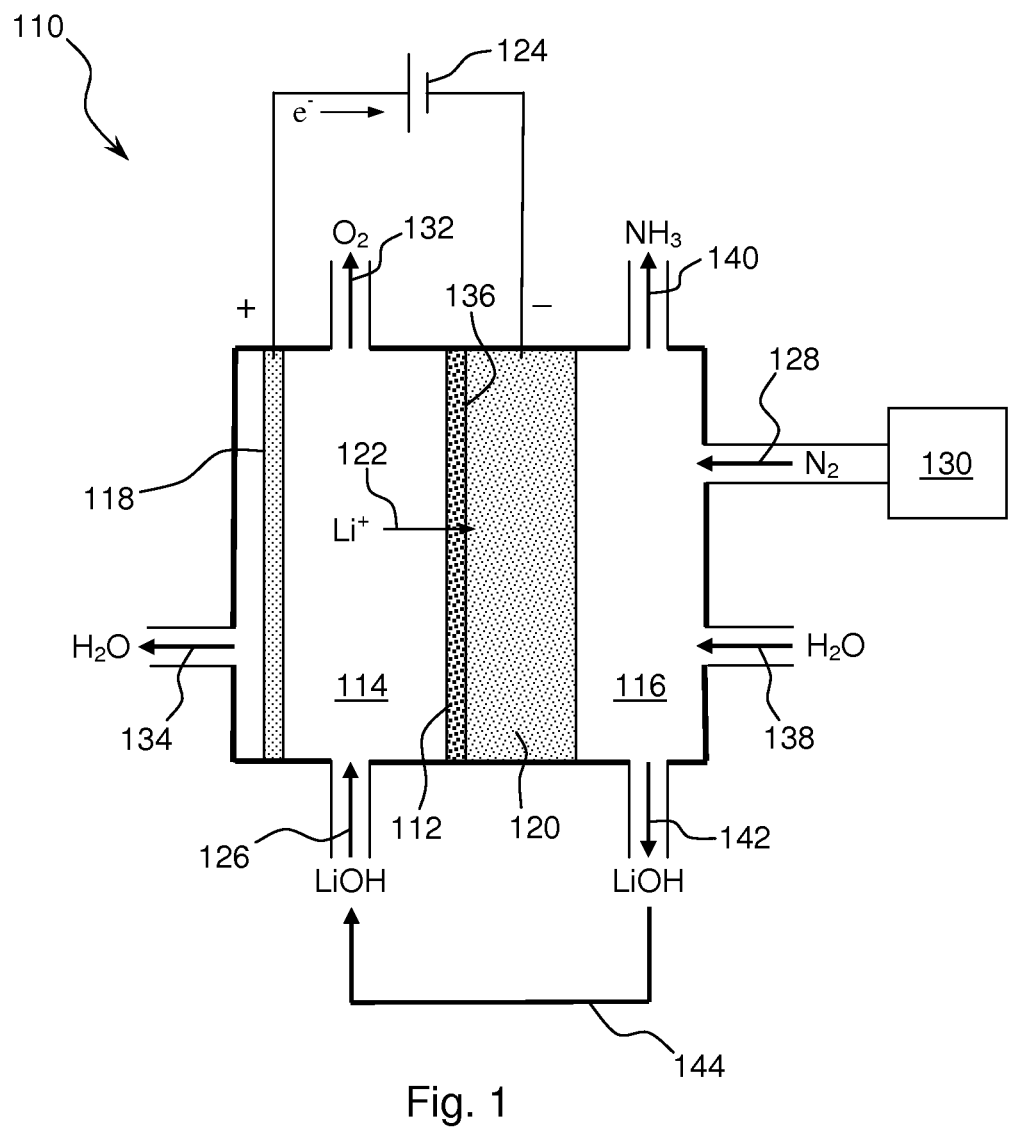

Lee, Jin H., "Written Opinion of the International Searching Authority", PCT application No. PCT/US2012/030264 (corresponding to U.S. Appl. No. 13/428,214), (Oct. 24, 2012),1-3.

Toru, Arakawa "Bibliographical Data and Abstract", JP 2001-324490, (Nov. 22, 2001),1-2.

Murakami, et al., "Electrolytic Synthesis of Ammonia in Molten Salts under Atmospheric Pressure", *J.Am.Chem.Soc.2003*, 125, (Jan. 15, 2003 (published online Dec. 12, 2002)),334-335.

\* cited by examiner

AMMONIA SYNTHESIS USING LITHIUM ION CONDUCTIVE MEMBRANE

CROSS-REFERENCE TO RELATED APPLICATION

This application claims the benefit of Provisional Patent Application No. 61/466,531, filed Mar. 23, 2011, and entitled AMMONIA SYNTHESIS USING LITHIUM ION CONDUCTIVE MEMBRANE, the entire disclosure of which is hereby incorporated by reference.

FIELD OF THE INVENTION

The disclosure relates to the synthesis of ammonia by a process using a lithium ion conductive membrane. The disclosure provides ammonia synthesis on demand from atmospheric nitrogen and water.

BACKGROUND OF THE INVENTION

Ammonia is an important inorganic chemical used for a variety of purposes. One conventional process to produce ammonia uses the Haber-Bosch process in which nitrogen gas and hydrogen gas are catalytically reacted at high temperature to form ammonia according to the reaction: $3H_2+N_2 \rightarrow 2NH_3$. Electrolytic ammonia synthesis from water and nitrogen gas has been proposed using various molten salt systems, such as a LiCl—KCl—CsCl melt. Such molten salt systems also operate at high temperatures.

One possible use of ammonia is in a system to control NOx emissions in power plants and motor vehicles. When NOx and volatile organic compounds react in the presence of sunlight they form photochemical smog. This smog is a significant form of air pollution, especially in the summertime. Children, people with lung diseases, such as asthma, and people who work or exercise outside are susceptible to adverse effects of smog such as damage to lung tissue and reduction in lung function. Also, NOx forms nitric acid when dissolved in atmospheric moisture, forming a component of acid rain. As is well known, acid rain causes negative visual and physical affects to buildings and other structures. Furthermore, any unnatural level of nitric acid in the environment due to acid rain is undesirable.

Selective catalytic reduction (SCR) may be used to reduce NOx from emissions of internal combustion engines. Conventional SCR techniques involve injecting ammonia supplied from a tank of liquid ammonia or urea (a major component of which is ammonia) into the emissions stream of the internal combustion engines. However, the liquid ammonia supply has to be maintained and replenished. Planning and performing periodic maintenance to check and replenish urea supplies is costly and, hence, can be dismissed, despite the negative environmental effects of NOx emissions. It would be desirable to produce ammonia as needed and eliminate the need for liquid ammonia storage and replenishment.

U.S. Pat. No. 7,708,966 discloses one non-limiting example of a SCR system utilizing an on-board ammonia generation system. The disclosed on-board ammonia generation system contains a hydrogen generation cell which electrolytically splits water into hydrogen and oxygen and nitrogen generator. The hydrogen and nitrogen catalytically react to form ammonia. The disclosed process produces ammonia as needed in a motor vehicle emission control system using water from the automobile exhaust and nitrogen from air.

It would be an advancement in the art to provide the synthesis of ammonia on demand from atmospheric nitrogen and water, without the need to electrolytically split water to form hydrogen.

BRIEF SUMMARY OF THE INVENTION

The present invention provides a process to synthesize ammonia on demand from atmospheric nitrogen and water. Ammonia is synthesized using electrochemical and non-electrochemical reactions.

The electrochemical reactions occur in an electrolytic cell having a lithium ion conductive membrane that divides the electrochemical cell into an anolyte compartment and a catholyte compartment. The catholyte compartment includes a porous cathode closely associated with the lithium ion conductive membrane. The overall electrochemical reaction is: $6LiOH+N_2 \rightarrow Li_3N \text{ (s)}+3H_2O+3/2O_2$. The nitrogen may be produced by a nitrogen generator.

The non-electrochemical reaction involves reacting lithium nitride with water and/or steam as follows: $Li_3N \text{ (s)}+3H_2O \rightarrow 3LiOH+NH_3 \text{ (g)}$. A stoichiometric or excess quantity of water may be used to react with lithium nitride. The ammonia is vented and collected. The lithium hydroxide is preferably recycled and introduced into the anolyte compartment. The electrolytic cell is shut down prior to reacting the lithium nitride with water. The cathode is preferably dried prior to start up of the electrolytic cell and electrolyzing $Li^+$ and $N_2$ at the cathode. The cathode may be dried using any convenient means, including but not limited to heat, dry nitrogen gas, or a combination of heat and nitrogen gas.

In some non-limiting embodiments, the lithium ion conducting membrane is a LiSICON (lithium super ionic conductor membrane) or a LiSICON-type membrane.

In some non-limiting embodiments, the anode is fabricated of an anode material selected from stainless steel, carbon steel, platinum, lead dioxide, and carbon-based materials. The anode may be fabricated of a dimensionally stable anode. The anode may be fabricated of a porous material.

In some non-limiting embodiments, the cathode is fabricated of a cathode material selected from nickel, titanium, stainless steel, graphite, carbons, molybdenum, iron, tungsten, and a nickel-cobalt-ferrous alloy. In other non-limiting embodiments, the cathode is fabricated as a gas diffusion electrode (GDE) to facilitate the reduction reaction. The cathode is preferably fabricated of a porous material.

In some embodiments, the cathode is positioned in close proximity to the lithium ion conductive membrane. In such cases, there may be little or no gap between the cathode and the lithium ion conductive membrane. A non-aqueous solvent may be disposed between the lithium ion conductive membrane and the cathode. In some embodiments, the non-aqueous solvent may penetrate the cathode. The non-aqueous solvent may comprise an ionic liquid such as those used in lithium ion batteries. Non-limiting examples of such solvents include organic ethers, propylene carbonate, and ethylene carbonate.

The process may be facilitated by including a catalyst associated with the cathode selected to aid in absorbing and reducing nitrogen. The process may be facilitated by including a catalyst associated with the cathode selected to promote the reaction between nitrogen with lithium. Non-limiting examples of catalysts that may be associated with the cathode include an iron catalyst and a zeolite catalyst.

In some embodiments, the nitrogen generator is selected from a solid electrolyte oxygen separator (SEOS), a polymeric membrane electrolyte oxygen separator, and a pressure swing absorption (PSA) oxygen separator. The nitrogen generated is preferably dry nitrogen, with little or no associated water.

BRIEF DESCRIPTION OF THE SEVERAL DRAWINGS

Figure 2:
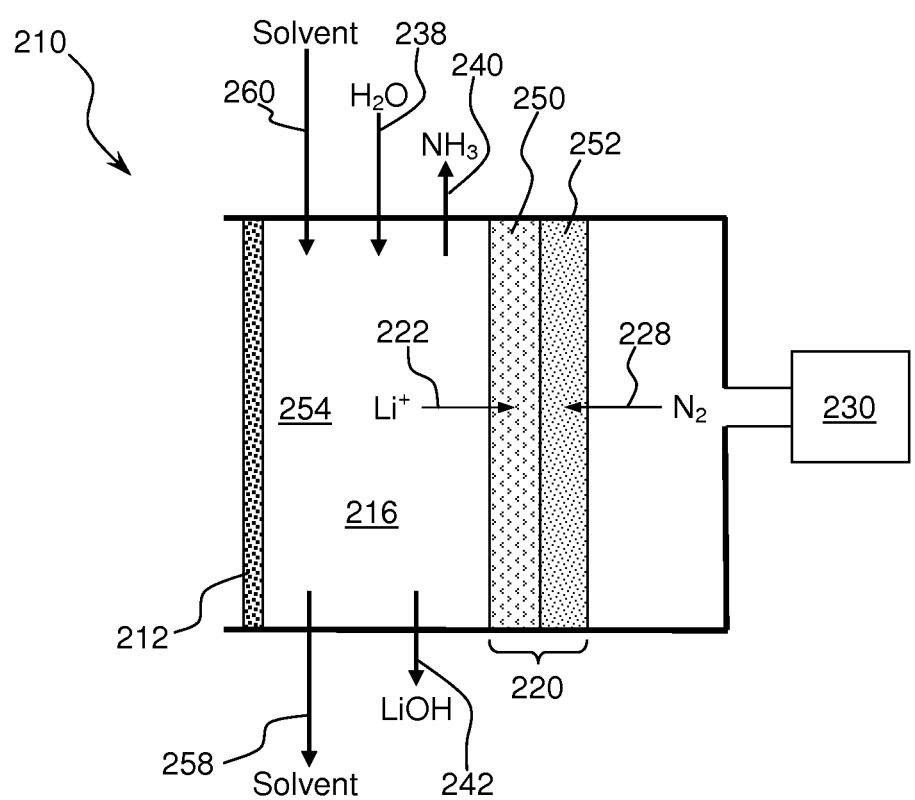

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings are not made to scale, depict only some representative embodiments of the invention, and are not therefore to be considered to be limiting of its scope, the invention will be described and explained with additional specificity and detail through the use of the accompanying drawings in which:

FIG. 1 schematically shows one possible electrolytic cell that may be used in the disclosed electrochemical process of synthesizing ammonia; and FIG. 2 schematically shows a catholyte compartment of one possible electrolytic cell utilizing a gas diffusion electrode.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are given, such as examples of suitable electrolytic cells and their features, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The disclosed process for synthesizing ammonia includes electrochemical and non-electrochemical reactions. The electrochemical reactions preferably occur in an electrolytic cell having a lithium ion conductive membrane that divides the electrochemical cell into an anolyte compartment and a catholyte compartment. The membrane can comprise virtually any suitable lithium ion conductive membrane. Some non-limiting examples of such membranes include, but are not limited to, a LiSICON (lithium super ionic conductor) structure ceramic type, pervoskite type Li-ion conductors such as $Li_{0.35}La_{0.55}TiO_3$, Li ion conducting glasses such as $Li_2S-P_2S_5-P_2S_3$ or $Li_2S-P_2S_5-P_2O_5$.

The electrochemical reactions may be summarized as follows:

At the anode/anolyte compartment:

$$6LiOH \rightarrow 6Li^+ + 6OH^- \quad \text{Equation 1}$$

$$6OH^- \rightarrow 3H_2O + 3/2O_2 + 6e^- \quad \text{Equation 2}$$

At the cathode/catholyte compartment:

$$6Li^+ + N_2 + 6e^- \rightarrow 2Li_3N(s) \quad \text{Equation 3}$$

Note that the actual electron transfer reduction reaction may be either or a combination of the following reactions:

$$6Li^+ + 6e^- \rightarrow 6Li \quad \text{Equation 3a}$$

$$N_2 + 6e^- \rightarrow 2N^{3-} \quad \text{Equation 3b}$$

If the reduction reaction is Equation 3a then the lithium metal will react with nitrogen gas to form lithium nitride. If the reduction reaction is Equation 3b then the nitride ion will react with lithium cation to form lithium nitride.

Overall Electrochemical Reaction:

$$6LiOH + N_2 \rightarrow Li_3N(s) + 3H_2O + 3/2O_2 \quad \text{Equation 4}$$

The non-electrochemical reaction involves reacting lithium nitride with water and/or steam as follows:

$$Li_3N(s) + 3H_2O \rightarrow 3LiOH + NH_3(g) \quad \text{Equation 5}$$

The ammonia is vented and collected. The lithium hydroxide is preferably recycled for use in Equation 1.

FIG. 1 schematically shows one possible electrolytic cell 110 that may be used in the electrochemical process of synthesizing ammonia within the scope of the present invention. The electrolytic cell 110 uses a lithium ion conductive membrane 112 that divides the electrochemical cell 110 into two compartments: an anolyte compartment 114 and a catholyte compartment 116. An electrochemically active anode 118 is housed in the anolyte compartment 114 where oxidation reaction (equation 2) take place, and an electrochemically active cathode 120 is housed in the catholyte compartment 116 where reduction reactions (equation 3) take place. The lithium ion conductive membrane 112 selectively transfers lithium ions 122 from the anolyte compartment 114 to the catholyte compartment 116 under the influence of an electrical potential 124.

The anode 118 can comprise any suitable anode material that allows the cell to oxidize hydroxide ions or water in the anolyte when electrical potential passes between the anode and the cathode. Some examples of suitable anode materials include, but are not limited to, stainless steel, C-steel, nickel-cobalt-ferrous alloy (e.g., a KOVAR® alloy), platinum, lead dioxide, carbon-based materials (e.g., graphite, boron-doped diamond, glassy carbon, synthetic carbon, etc.), and other known or novel anode materials. Additionally, in some embodiments the anode comprises a dimensionally stable anode, which may include, but is not limited to, rhenium dioxide and titanium dioxide on a titanium substrate, and rhenium dioxide and tantalum pentoxide on a titanium substrate. The anode 118 need not be porous, but may be fabricated of a porous material.

The cathode 120 may also be fabricated of any suitable cathode that allows the cell to reduce lithium ions and react with nitrogen to form lithium nitride. The cathode 120 is preferably porous to permit penetration of nitrogen. In this regard, some examples of suitable cathode materials include, without limitation, nickel, copper, titanium, stainless steel, graphite, other forms of carbon, nickel-cobalt-ferrous alloy, and any other suitable cathode material that is known for lithium metal plating or catalytic to nitrogen reduction or novel. The cathode may be Gas Diffusion Electrode (GDE) type electrode, where the nitrogen gas may be fed via the gas diffusion layer and reach the reaction layer where reduction reactions occur. The cathode is preferably positioned in close proximity to the lithium ion conductive membrane 112. In some embodiments, there is little or no gap between the cathode 120 and the membrane 112.

A catalyst may optionally be used with the cathode to aid in absorbing and reducing nitrogen. The catalyst may also be distributed within the reaction layer of the GDE to facilitate reduction of nitrogen. The catalyst may also be selected to promote the reaction between nitrogen with lithium. Non-limiting examples of catalysts or electrocatalysts are zeolite (such as ZSM-5), molybdenum, iron, ruthenium, tungsten containing materials Alternatively coordination complexes similar to nitrogenase can also be used.

The electrolytic cell 110 is operated by feeding an aqueous lithium hydroxide solution 126 into the anolyte compartment 114. The concentration of lithium hydroxide in the aqueous solution should be below its saturation limit in water. The concentration of lithium hydroxide in the aqueous solution is between about 2% by weight and about 30% by weight of the solution, and more preferably between about 10% by weight and 20% by weight of the solution. Alternatively the anolyte may be single or mixed salts of lithium such as Li halide, Li carbonate, Li hydroxide in the molten form or dissolved in a variety of low and high temperature organic or ionic liquid solvents.

The electrolytic cell can be operated at temperatures between ambient to temperatures where the lithium metal formed as cathode reduction product is molten. The high temperature may also aid in electroreduction of nitrogen gas or to promote the reaction between Li metal and nitrogen gas.

Nitrogen 128 is fed into the catholyte compartment 116. A nitrogen generator 130 may be used to provide the source of nitrogen 128. The nitrogen generator 130 may utilize technology to separate nitrogen from the atmosphere. The nitrogen generator may have one or more of a variety of separators including, but not limited to, a solid electrolyte oxygen separator (SEOS), a polymeric membrane electrolyte oxygen separator, and a pressure swing absorption (PSA) oxygen separator. The polymeric membrane electrolyte oxygen separator and the PSA oxygen separator, when used by themselves are each typically less effective than the SEOS. Thus, the nitrogen generator may include a combination of two or more separators such as a PSA and a SEOS, for example. Any combination of oxygen separators may be utilized in order to separate oxygen from air and supply nitrogen to the catholyte compartment.

During operation, the source of lithium ions is provided by lithium ions 122 transporting across the lithium ion conductive membrane 112 from the anolyte compartment 114 to the catholyte compartment 116.

Under the influence of electric potential 124, electrochemical reactions take place at the anode 118 and cathode 120. Oxidation of hydroxide ions to form oxygen 132 and water 134 occurs at the anode 118.

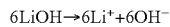  Equation 1

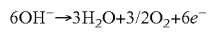  Equation 2

Reduction of lithium ions (equation 3a) or reduction of nitrogen (equation 3b) to form lithium nitride occurs at the cathode 120. In some embodiments, this reaction may occur close to the interface 136 of the lithium ion conductive membrane 112 and the cathode 118. The lithium nitride collects in the porous cathode 120.

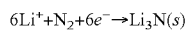  Equation 3

As the reactions occur at the electrodes, lithium ions 122 are transported from the anolyte compartment 114 across the lithium ion conductive membrane 112 into the catholyte compartment 116.

The second aspect of the present invention is the production of ammonia from lithium nitride. Periodically, the electric potential 124 is shut down and the cathode 120 is washed with steam and or water 138 to remove lithium nitride from the porous cathode 120. The lithium nitride reacts with water to form ammonia 140 and lithium hydroxide 142 that will dissolve in water to form LiOH solution.

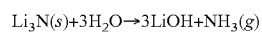  Equation 5

The ammonia gas 140 is collected. The lithium hydroxide solution 142 may optionally be recycled 144 back to the anolyte compartment 114 and form all or part of the lithium hydroxide 126.

Preferably a stoichiometric quantity of water is used to wash the cathode 120 and react with lithium nitride according to Equation 5, although excess water may be used. Following washing of the cathode 120, it is preferably dried to remove water. The presence of water on the cathode would interfere with the reduction of lithium and create the potential for unwanted reaction between lithium and water. The cathode 120 may be dried in any suitable manner. In one embodiment, the cathode is dried using a heat, dry nitrogen gas, or a combination of heat and nitrogen gas.

FIG. 2 schematically shows a partial view of the catholyte compartment 216 of an electrolytic cell 210 in which the cathode 220 is a gas diffusion electrode (GDE) type electrode. Reference is made to FIG. 1 for those parts of the electrolytic cell that are not shown in FIG. 2. The structure and operation of gas diffusion electrodes are known in the art. Such electrodes are useful for reactions which involve multiple phases, that is, reactions that occur at a solid, liquid, and gaseous interface. GDEs are porous to allow diffusion of both gaseous and liquid reactants. The gas diffusion electrode includes a reaction layer 250 and a gas supply layer 252. In some embodiments, the gas supply layer 252 is liquid impermeable or has a liquid impermeable outer coating which is permeable to nitrogen 228 but impermeable to liquid solvents. A solvent 254 is preferably present in the space between the lithium ion conductive membrane 212 and the reaction layer 250. The solvent 254 is a non-aqueous solvent which may comprise an ionic liquid such as those used in lithium ion batteries. Non-limiting examples of such solvents include organic ethers, propylene carbonate, and ethylene carbonate. The solvent 254 may penetrate the reaction layer 250 of cathode 220 so that lithium ions 222 may penetrate the reaction layer sufficient to contact nitrogen and undergo the disclosed reduction reaction.

Electrolytic cell 210 operates in a manner similar to electrolytic cell 110, disclosed above. Nitrogen 228 is fed into the catholyte compartment 216. A nitrogen generator 230, such as those described above, may be used to provide the source of nitrogen 228. Lithium ions 222 transported across the lithium ion conductive membrane 212 are dissolved in solvent 254 and penetrate the cathode 220.

Under the influence of an electric potential such as shown in FIG. 1, electrochemical reactions take place at the anode and cathode. Lithium ions electrochemically react with nitrogen at the cathode 220 to form lithium nitride according to Equation 3. Such reaction may occur in the reaction layer 250 at a triple phase boundary. The lithium nitride collects in the porous cathode 220.

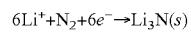  Equation 3

The second aspect of the present invention is the production of ammonia from lithium nitride in a non-electrochemical reaction. Periodically, the electric potential driving the electrolytic cell is shut down, and the solvent 254 is drained 258 from the catholyte compartment 216. The cathode 220 is washed with steam and or water 238 to remove lithium nitride from the porous cathode 220. The lithium nitride reacts with water to form ammonia 240 and lithium hydroxide 242 that will dissolve in water to form LiOH solution according to Equation 5.

$$Li_3N(s)+3H_2O \rightarrow 3LiOH+NH_3(g) \qquad \text{Equation 5}$$

The ammonia gas 240 is collected. The lithium hydroxide solution 242 may optionally be recycled back to the anolyte compartment as described above.

Preferably a stoichiometric quantity of water is used to wash the cathode 220 and react with lithium nitride according to Equation 5, although excess water may be used. Following washing of the cathode 220, it is preferably dried to remove water. The presence of water on the cathode would interfere with the reduction of lithium and create the potential for unwanted reaction between lithium and water. The cathode 220 may be dried in any suitable manner as disclosed above. Thereafter, solvent 254 may be reintroduced 260 into the catholyte compartment 216. The electric potential driving the electrolytic cell may be restored to drive the electrochemical reactions described above.

While specific embodiments and examples of the present invention have been illustrated and described, numerous modifications come to mind without significantly departing from the spirit of the invention, and the scope of protection is only limited by the scope of the accompanying claims.

The invention claimed is:

1. A process for synthesizing ammonia, comprising:
providing an electrolytic cell comprising a lithium ion conducting membrane configured to selectively transport lithium ions, the membrane positioned between an anolyte compartment configured with an anode and a catholyte compartment configured with a cathode;
introducing aqueous LiOH into the anolyte compartment;
introducing $N_2$ into the catholyte compartment; and
electrolyzing the aqueous LiOH at the anode according to the following oxidation reaction:

$$6LiOH \rightarrow 6Li^+ + 3H_2O + 3/2O_2 + 6e^-$$

electrolyzing $Li^+$ and $N_2$ at the cathode according to the following reduction reaction:

$$6Li^+ + N_2 + 6e^- \rightarrow Li_3N(s)$$

reacting the $Li_3N$ with $H_2O$ according to the following reaction:

$$Li_3N(s) + 3H_2O \rightarrow 3LiOH + NH_3(g)$$

recovering the $NH_3$; and
recovering the LiOH.

2. The process according to claim 1, wherein the lithium ion conducting membrane is a LiSICON (lithium super ionic conductor) membrane.

3. The process according to claim 1, wherein the recovered LiOH is recycled and introduced into the anolyte compartment.

4. The process according to claim 1, wherein the anode is fabricated of an anode material selected from stainless steel, carbon steel, platinum, lead dioxide, and carbon-based materials.

5. The process according to claim 1, wherein the anode is fabricated of a dimensionally stable anode.

6. The process according to claim 1, wherein the anode is fabricated of a porous material.

7. The process according to claim 1, wherein the cathode is fabricated of a porous material.

8. The process according to claim 1, wherein the cathode is fabricated as a gas diffusion electrode (GDE) to facilitate the reduction reaction.

9. The process according to claim 1, wherein the cathode is fabricated of a cathode material selected from nickel, titanium, stainless steel, graphite, carbons, molybdenum, iron, tungsten, and a nickel-cobalt-ferrous alloy.

10. The process according to claim 1, wherein the cathode is positioned in close proximity to the lithium ion conductive membrane.

11. The process according to claim 1, wherein there is little or no gap between the cathode and the lithium ion conductive membrane.

12. The process according to claim 1, wherein the concentration of LiOH in the aqueous LiOH introduced into the anolyte compartment is between about 10% by weight and about 20% by weight of the solution.

13. The process according to claim 1, further comprising a catalyst associated with the cathode selected to aid in absorbing and reducing $N_2$.

14. The process according to claim 1, further comprising a catalyst associated with the cathode selected to promote the reduction reaction between the $N_2$ and the $Li^+$.

15. The process according to claim 1, further comprising an iron catalyst associated with the cathode.

16. The process according to claim 1, further comprising a zeolite catalyst associated with the cathode.

17. The process according to claim 1, wherein the nitrogen introduced into the catholyte compartment is produced by a nitrogen generator.

18. The process according to claim 17, wherein the nitrogen generator is selected from a solid electrolyte oxygen separator (SEOS), a polymeric membrane electrolyte oxygen separator, and a pressure swing absorption (PSA) oxygen separator.

19. The process according to claim 1, wherein the electrolytic cell is shut down prior to reacting the $Li_3N$ with the $H_2O$.

20. The process according to claim 19, wherein the cathode is dried prior to start up of the electrolytic cell and electrolyzing the $Li^+$ and the $N_2$ at the cathode.

21. The process according to claim 20, wherein the cathode is dried using heat, dry nitrogen gas, or a combination of heat and dry nitrogen gas.

22. The process according to claim 1, wherein a stoichiometric or excess quantity of $H_2O$ is used to react with $Li_3N$.

* * * * *